May 18, 1926.

R. MATTEUCCI

PLANETARY GEAR

Filed Oct. 23, 1924     4 Sheets-Sheet 1

1,585,198

Inventor
R. Matteucci
by Langner Perry
Card & Langner
Att'ys

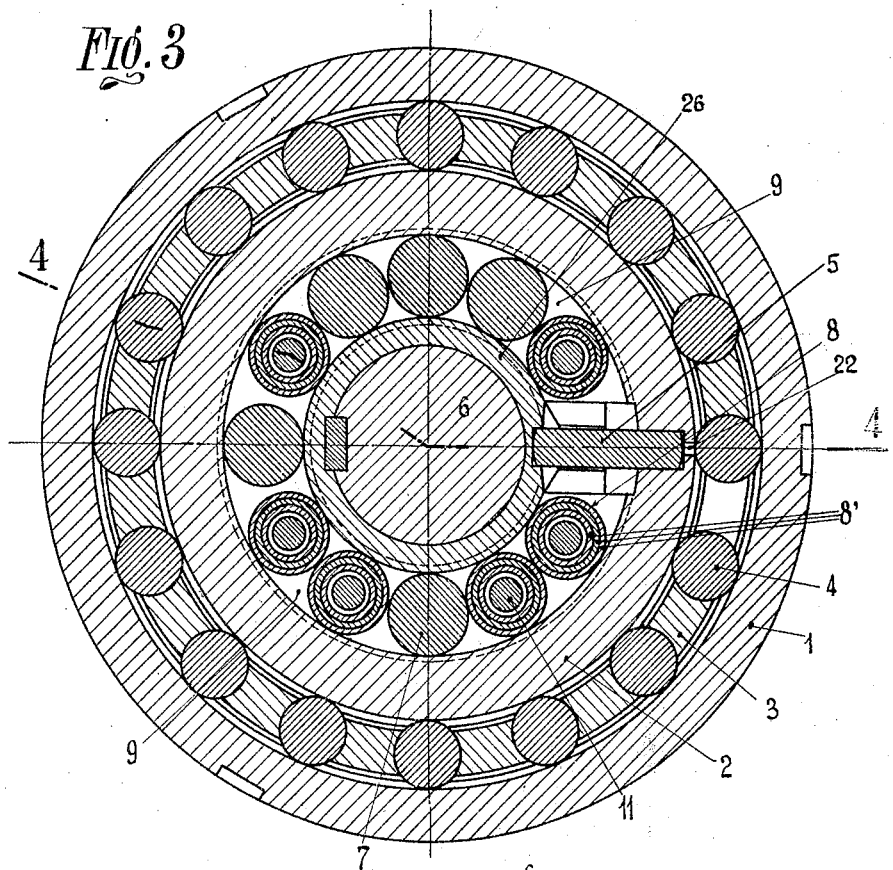
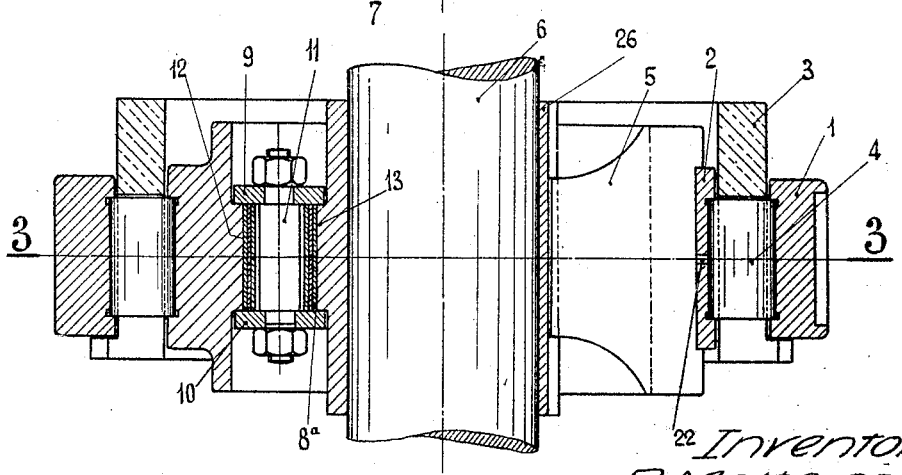

May 18, 1926.
R. MATTEUCCI
PLANETARY GEAR
Filed Oct. 23, 1924
1,585,198
4 Sheets-Sheet 3
Fig. 5
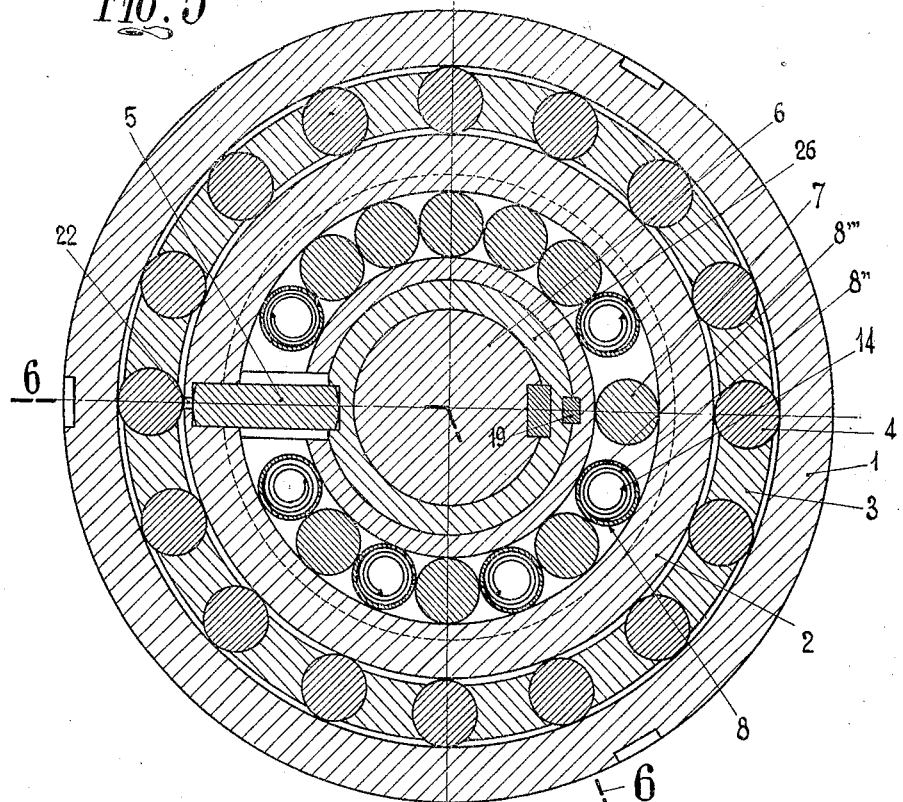
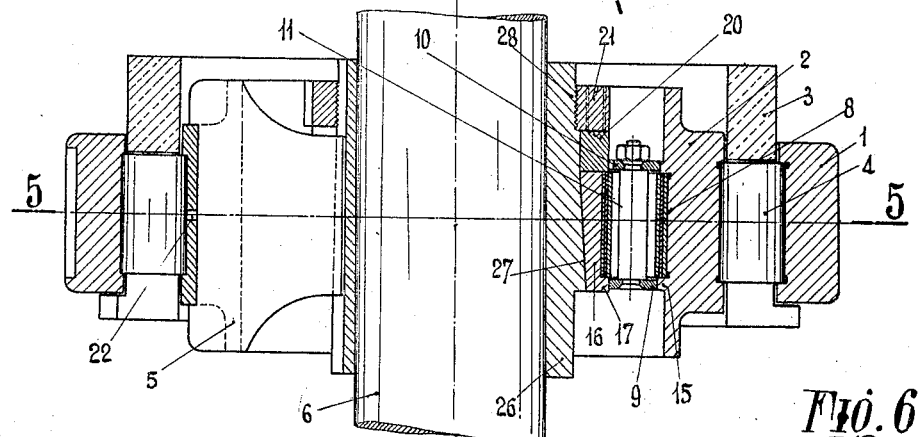
Fig. 6
Inventor
R. Matteucci
by Langner Parry Card & Langner
Att'ys.

May 18, 1926.

R. MATTEUCCI

PLANETARY GEAR

Filed Oct. 23, 1924

Inventor
R. Matteucci
by Langner, Parry, Card & Langner
Attys.

Patented May 18, 1926.

1,585,198

UNITED STATES PATENT OFFICE.

RAFFAELE MATTEUCCI, OF TURIN, ITALY.

PLANETARY GEAR.

Application filed October 23, 1924. Serial No. 745,498.

It is known that in planetary gears in which the drive is transmitted by positive action of adhesion of a series of satellite rollers contacting two concentric cylindrical tracks provided respectively on an outer ring and on an inner expansible ring whose expansion is produced by an automatic regulating device operated by the driving torque, the pressure produced by said expansible ring on said rollers must be automatically adjusted to correspond at each moment with the torque transmitted by the gear, and a light pressure is further required to be maintained at any time on said rollers when the gear is at rest, and also when it runs idle, being this light pressure necessary to allow the automatic regulating pressure device to act as soon as the load must be transmitted through the planetary gear.

The present invention has for its object a device for producing said permanent minimum pressure as required for the gear operation, said device, in the case of a gear intended to transmit the drive usually always in the same direction, providing also means for producing a permanent radial stress in a determined direction to cause the gear parts to bear permanently on each other at a given portion thereof, this feature avoiding beatings and shocks between said parts and consequent noise.

On the annexed drawings are illustrated by way of example embodiments of the present invention and:—

Figures 3 and 4 are sections similar to Figures 1 and 2 of a modified construction;

Figures 5 and 6 are sections similar to Figures 1 and 2 of a further modification;

Figure 1:
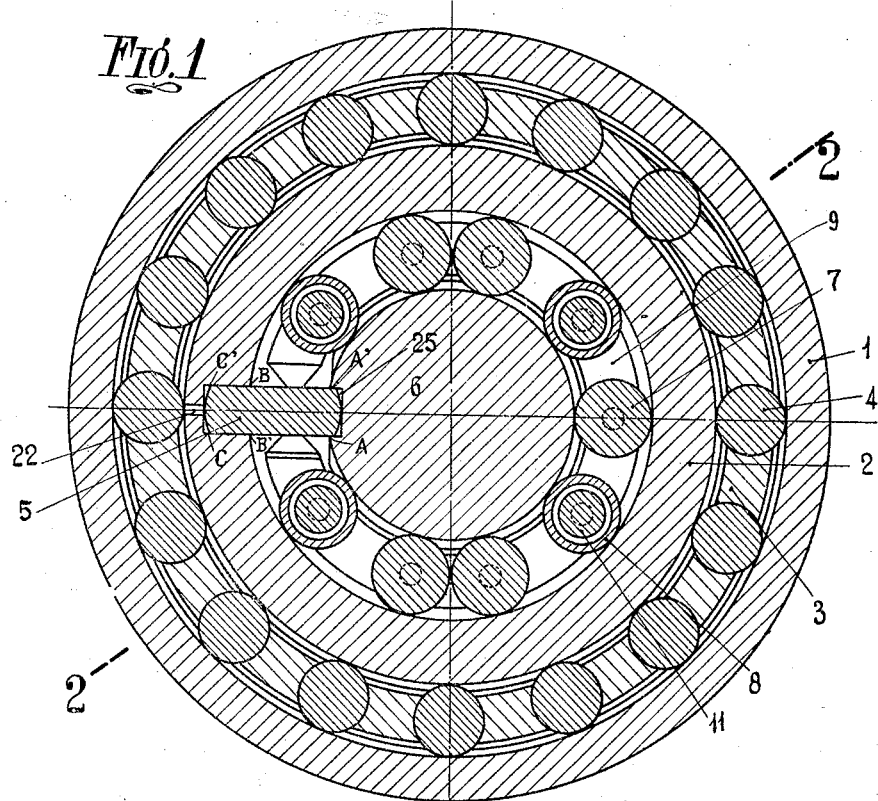
Figure 1 is a section on line 1—1 of Figure 2 of a planetary gear.

In the construction illustrated in Figure 1, 1 is the outer ring of a planetary gear and 2 is the expansible ring solid in rotation through the pressure automatic device with a shaft 6 and cooperating with the ring 1 to provide an intermediate annular gap where are located a cage 3 and the transmission satellite rollers 4 engaged therewith. Said ring 1 is solid with a suitable supporting casing 23 and the cage 3 is solid with another shaft 24.

Between the ends of the expansible ring 2 which is slanting split at 22, is located a plate 5 having its edge engaged in a recess 25 of the shaft 6; said plate under the action imparted thereto by the shaft 6 makes solid in rotation these two parts and, acting as a lever resting in A B C or in A'—B'—C' according to the direction of the torque, causes the expansion of said split ring 2 and adjusts automatically the pressure produced by it on the rollers 4 which are frictionally engaged on the tracks of rings 1 and 2 with a pressure depending at any time upon the value of the torque transmitted by the gear.

According to the present invention, intermediate the ring 2 and the shaft 6 are located positioning centering members comprising a number of solid rollers 7 and resilient or spring members 8.

Figure 2:
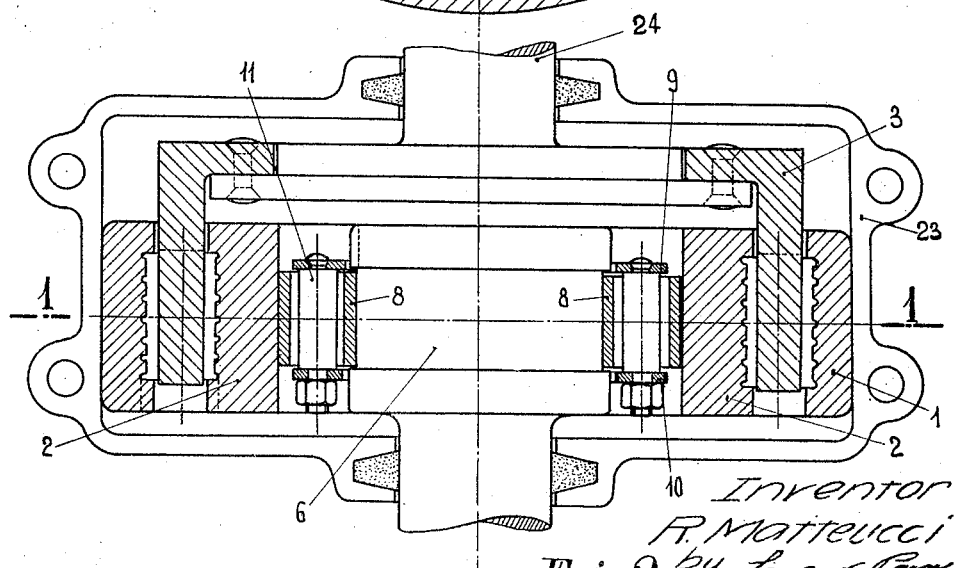
Figure 2 is a section on line 2—2 of Figure 1.

In the construction of Figures 1 and 2 said resilient members consist of cylindrical sleeves 8 having a suitable thickness and made of spring metal and they may have a continuous integral surface or be split.

The outer diameter of said sleeves 8 when removed from the gear is larger than the gap in which they are to be located, and they are introduced in position by forcing them axially one by one in said gap, they then taking up a somewhat elliptical configuration when in position between ring 2 and shaft 6.

Said sleeves 8 are held in position by split rings 9 and 10 and by bolts 11 passing freely through said sleeves and fastened to said rings; the rings 9 and 10 are split and elastically rest by means of their ends against the plate 5 and further they carry the solid positioning rollers 7.

To improve the resiliency and the action of the sleeves 8 each sleeve 8 may be provided by two or more tubular spring members 8' inserted on each other, as shown in Figures 3 and 4, the flexbility of each composite sleeve (hereinafter referred to in its whole by 8) being improved with respect to an integral sleeve of the same thickness.

In the construction illustrated in Figures 3 and 4 the inner surface of the ring 2 and the outer surface of a sleeve 26 fastened on the shaft 6 have projecting rims 12 and 13 respectively, between which are located said resilient sleeves 8 which are engaged in a cage provided by split rings 9 and 10 loosely abutting on the sides of rims 12 and 13 and carrying the pivot bolts 11 for said sleeves 8; solid positioning rollers 7 are also engaged in said cage. This arrangement makes the ring 2 axially solid with the sleeve 26. Each sleeve 8 has a tapering edge 8ª providing for its easy insertion between rims 12 and 13, and said sleeves are inserted in position individually by forcing each of them longitdinally between said rims, this operation being assisted by said bevelled edge 8ª as above described.

Figures 5 and 6 show a modification in which each of said resilient members 8 consists of a spirally wound metal blade 8" having its inner edge fastened on the first convolution at 14, the spiral spring thus provided being encircled by a resilient sleeve 8'''.

Figure 6 shows also a modification of means for mounting said resilient members in position. In this construction the internal surface of the ring 2 has two circumferential ribs 15 providing shoulders for the resilient members 8 and rollers 7; the cage 9—10 with rollers 7 and resilient members 8 loosely engaged therein by bolts 11 is inserted in position and the said rollers and resilient members are positioned between ribs 15. Then an expansible ring 16 is introduced inside the row of said rollers and members said ring 16 having an outer flange 17 and a conical bore, and finally a sleeve 26 having a conical portion 27 is forced in said bore with a cotter 19, making it solid in rotation with said ring 16. A split collar 20 is located on the sleeve 26 to provide a shoulder for rollers 7 and resilient members 8 and then a nut 21 is threaded on the screw threaded portion 28 of the sleeve 26 to produce the longitudinal respective motion of said parts 27 and 16 and cause the expansion of ring 16 until the rollers 7 are caused to contact with both rings 16 and 2 and the spring members 8 are suitably compressed.

Figure 8:
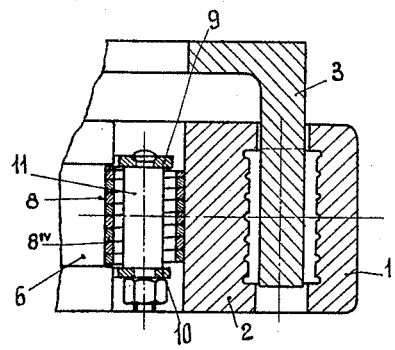

Figure 8 shows a modification in which said resilient members 8 consist of a wire 8ᴵⱽ wound to a cylindrical coil, the mounting and operation of the spring members of this kind being the same as described in connecton with the above described constructions of the same.

When the resilient members 8 are compressed to the same extent and are arranged in a symmetrical manner with respect to the shaft axis, their action is balanced and the direction and value of the action exerted by the shaft 6 or sleeve 26 on the ring 2 through the rollers 7 depend merely upon the value of the bearing reaction of the load produced by the shaft 6 or sleeve 26 on the edge of the lever plate 5, and therefore when such a reaction is reduced to a minimum value or is made zero, as it happens when the gear turns idle and when the rollers 7 have some clearance between the shaft 6 or sleeve 26 and the ring 2, the shaft 6 may be subject to vibrations and produce noise.

In the case the drive is to be usually transmitted always in the same direction said drawback may be removed by arranging the resilient members 8 in such a manner as the resultant of their actions has a given direction which preferably is the direction in which acts the reaction of the shaft 6 during the drive.

Then even when the gear turns idle, a pressure is exerted by rollers 7 on the same portion of the ring 2 on which acts the pressure produced by said bearing reaction and thus the bearing conditions of the gear parts are unchanged both in idle and in drive conditions.

Figure 7:
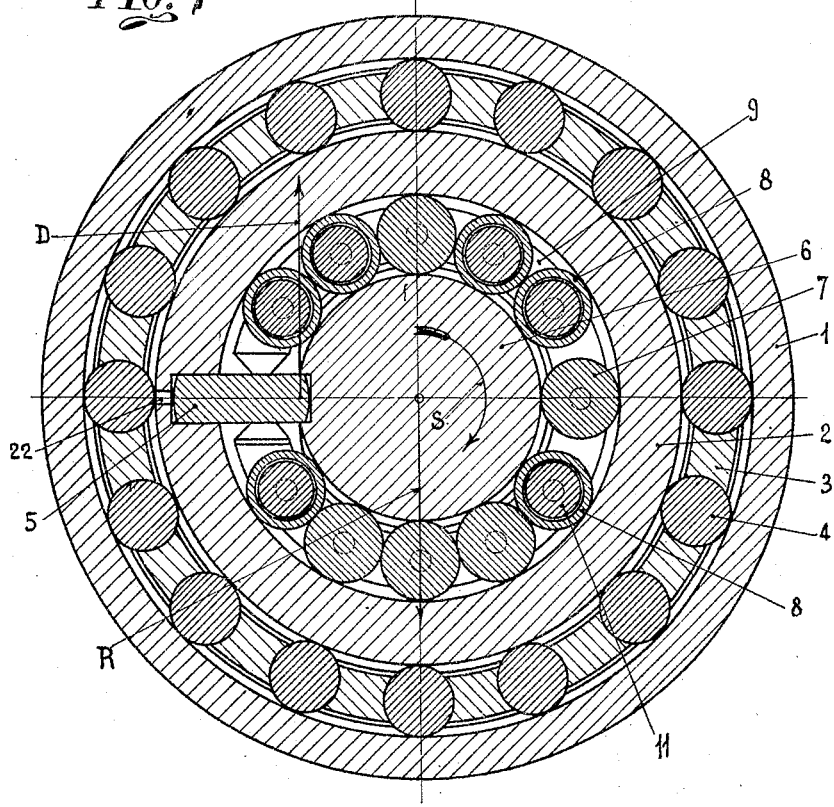
Figure 7 is a section similar to Figure 1 showing a modified arrangement of the parts and Figure 8 shows a modified form of resilient positioning member according to the present invention.

Such a result may be obtained by arranging a larger number of resilient members 8 at the side of the shaft axis opposite to that where the parts must bear on each other, as shown in Figure 7, or by giving to members located on one side with respect to plate 5 a different resiliency or diameter (when in released conditions) with respect to ones located on the opposite side.

In the construction illustrated in Figure 7 the action of the shaft 6 on rollers 7 and ring 2 has always in usual conditions the direction of the arrow R both under effect of the transmission reaction when rotating in the direction of the arrow S and driving the plate 5 in the direction of arrow D, and under the action of the resilient members 8 located in the top portion of the device, when rotating idle, said top members being four in number while the bottom ones are two.

The parts are thus always forced to contact with each other at the same portions thereof, whatever may be their clearance, and thus the transmission is regular and noiseless.

What I claim as my invention and desire to secure by United States Letters Patent is:—

1. In a planetary gear comprising an outer ring member, a concentric inner expansible member, a member supporting said expansible member and drive transmission satellite rollers intermediate and contacting said ring and expansible members: resilient members intermediate said expansible member and supporting member forcing said expansible member and satellite drive rollers on said outer ring member.

2. In a planetary gear comprising an outer ring member, a concentric inner expansible member, a member supporting said expansible member and drive transmission, satellite rollers intermediate and contacting said ring and expansible members:— centering members intermediate said expansible member and supporting member and resilient members intermediate said expansible member and supporting member forcing said expansible member and drive satellite rollers on said outer ring member.

3. In a planetary gear comprising an outer ring member, a concentric inner expansible member, a member supporting said expansible member and drive transmission satellite rollers intermediate and contacting said ring and expansible members: resilient members intermediate said expansible member and supporting member forcing said expansible member and drive satellite rollers on said outer ring member, said resilient members consisting each of a hollow roller.

4. In a planetary gear comprising an outer ring member, a concentric inner expansible member, a member supporting said expansible member and drive transmission satellite rollers intermediate and contacting said ring and expansible members: resilient members intermediate said expansible member and supporting member forcing said expansible member and drive satellite rollers on said outer ring member, said resilient members being unbalanced in their action to produce a radial pressure in a given direction on said expansible member and coöperating parts.

5. In a planetary gear comprising an outer ring member, a concentric inner expansible member, a member supporting said expansible member and drive transmission satellite rollers intermediate and contacting said ring and expansible members: resilient members intermediate said expansible member and supporting member forcing said expansible member and drive satellite rollers on said outer ring member, said resilient members being in a greater number on the portion of said ring opposite that where the contact of the gear parts is desired.

In testimony whereof I have signed my name to this specification.

RAFFAELE MATTEUCCI.